H. H. SUTRO, DEC'D.
V. SUTRO, ADMINISTRATOR.
APPARATUS FOR MEASURING LIQUIDS.
APPLICATION FILED OCT. 3, 1913.
1,138,700.
Patented May 11, 1915.
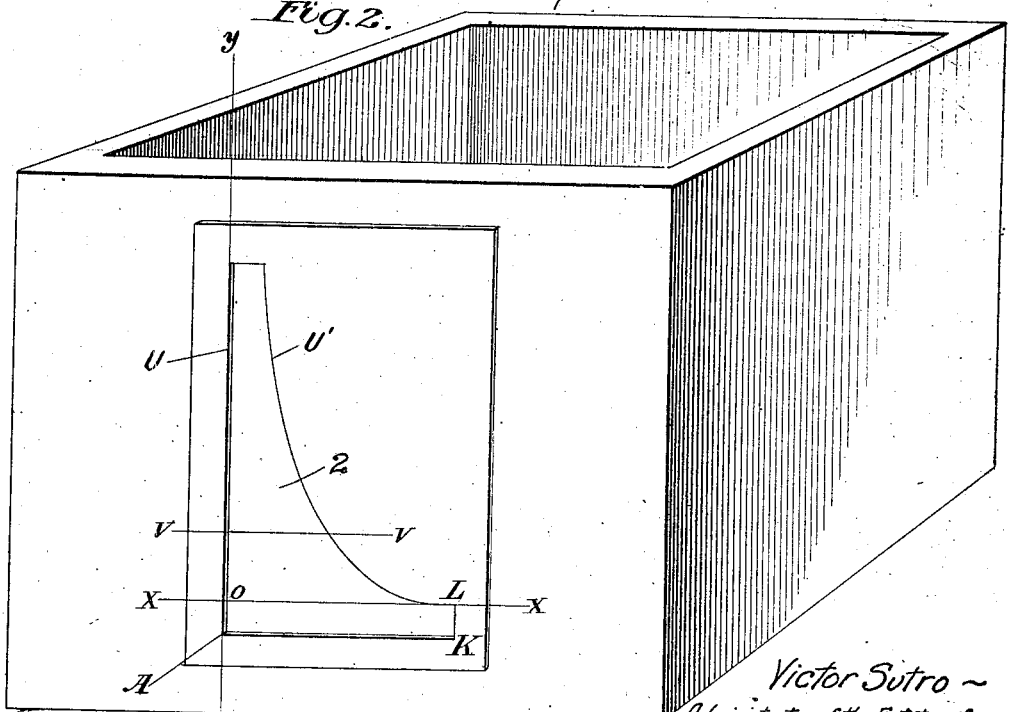

UNITED STATES PATENT OFFICE.

HARRY HERBERT SUTRO, DECEASED, BY VICTOR SUTRO, ADMINISTRATOR, OF NEW YORK, N. Y., ASSIGNOR TO L. M. BOOTH COMPANY, A CORPORATION OF NEW YORK.

APPARATUS FOR MEASURING LIQUIDS.

1,138,700.           Specification of Letters Patent.      Patented May 11, 1915.

Original application filed June 1, 1909, Serial No. 499,559. Divided and this application filed October 3, 1913. Serial No. 793,209.

*To all whom it may concern:*

Be it known that I, VICTOR SUTRO, a citizen of the United States, residing at New York city, in the county of New York and State of New York, as the administrator of the estate of HARRY HERBERT SUTRO, deceased, declare that said HARRY HERBERT SUTRO invented a new and useful Improvement in an Apparatus for Measuring Liquids, of which the following is a specification.

This application is filed as a division of application of Harry Herbert Sutro for patent for improvements in water softening devices, filed June 1, 1909, Serial No. 499,559 (patented Nov. 4, 1913, No. 1,077,316).

This invention relates to improvements in apparatus for measuring liquids, and the object of my invention is to provide an apparatus for measuring liquids having a discharge outlet so formed that the flow of liquid therethrough will be in direct proportion to the height of liquid above a predetermined point.

The other objects and features of my invention are particularly described in the specification and appended claims.

In the accompanying drawings, Figure 1 is a diagrammatic view illustrating mathematical demonstration of the theory of the improved weir. Fig. 2 is a general view showing the application of the invention to a liquid container.

Similar reference characters designate corresponding parts throughout the several figures of the drawings.

It will be understood that many changes may be made in the apparatus without departing from the spirit or scope of my invention.

My apparatus consists of a liquid container 1, into which the liquid to be measured is discharged, provided with a discharge orifice 2 in one of the walls thereof, such discharge orifice being of such shape that the flow of liquid therethrough will be in direct proportion to the height of the liquid above a fixed point.

In the preferable form of the invention, a distinct feature thereof resides in having a minimum operative level above the datum level and a bottom level below the datum level, in combination with a continuous curve extending from the minimum operative level to the maximum operative level, the width of the notch above the minimum operative level being such that the flow of liquid therethrough will at all levels above the minimum level be in direct proportion to the height of liquid above the datum level. In the illustration shown in the drawings, the bottom level of the notch is designated by the letters A—K, the minimum operative level by the letters X—X, and the datum level by the letters M—N, with the distance between the bottom of the notch and the minimum operative level designated by the reference letter $a$. To fully illustrate the mathematical principles underlying a weir notch having these characteristics, the following mathematical demonstration is given in explanation thereof:

Given: A weir opening composed of the rectangle AOLK, and the upper curved portion bounded by the straight line AU and the curve LU' lying above the rectangle AOLK.

To find: The equation determining the shape of the curve LU' such that the discharge of the liquid through the orifice AUU'LK will at all times be in direct proportion to the height of the surface of the liquid above the datum line MN.

The total discharge through the orifice AUU'LK is made up of the discharge ($Q_1$) through the rectangle AOLK under a head "$h$" above the top of the rectangle, plus the discharge ($Q_2$) through the portion of the weir above the line XX.

For convenience of calculation and practical operation the datum line MN is taken a distance $\tfrac{1}{3}a$ above the base AK of the rectangle AOLK.

From the fundamental laws of hydraulics the discharge of the rectangle AOLK is found to be, $$Q_1 = \tfrac{2}{3}cl\sqrt{2g}[(h+a)^{\tfrac{3}{2}} - h^{\tfrac{3}{2}}] \quad (1)$$

where $c$ is the coefficient of discharge of the orifice, usually taken as .62, and the other letters have the significance indicated on the accompanying drawing, "$g$" being the measure of acceleration due to gravity.

To determine the discharge of the curved portion of the weir above the rectangle AOLK, consider a strip of infinitesimal width "$dy$" and length "$x$" situated a distance "$y$" above the axis of coördinates XX; the axis YY coinciding with the straight vertical side of the weir opening. The discharge through this strip being proportional directly to the area of the strip and to the square root of the head ($h-y$) of liquid above it, this discharge ($dQ_2$) may be expressed, $$dQ_2 = c\sqrt{2g}\, x\, dy\, \sqrt{h-y}$$

$x\, dy$ being the area of the strip and $c$ being the coefficient of discharge above mentioned. Applying the methods and notation of the integral calculus, the total discharge $Q_2$ being the summation of the infinitesimal discharges $dQ_2$ between the lower limit when $y=o$, and the upper limit when $y=h$, the discharge $Q_2$ may be written, $$Q_2 = c\sqrt{2g}\int_0^h x\sqrt{h-y}\, dy \quad (2)$$

since the total discharge ($Q$) of the weir is the sum of $Q_1+Q_2$, therefore, $$Q = \tfrac{2}{3}cl\sqrt{2g}[(h+a)^{\frac{3}{2}} - h^{\frac{3}{2}}] + c\sqrt{2g}\int_0^h x\sqrt{h-y}\, dy$$

But the total discharge $Q$ must be directly proportional to the height of the surface of the liquid above the datum line MN, or, in other words, $Q$ must be equal to $(h+\tfrac{2}{3}a)$ multiplied by a constant quantity (K). Therefore, $$Q = K(h+\tfrac{2}{3}a) \quad (3)$$

and $$K(h+\tfrac{2}{3}a) = \tfrac{2}{3}cl\sqrt{2g}[(h+a)^{\frac{3}{2}} - h^{\frac{3}{2}}] + c\sqrt{2g}\int_0^h x\sqrt{h-y}\, dy \quad (4)$$

To determine the value of "K" let "$h$"$=o$. Consequently the total discharge, $Q$, will be equal to the discharge, $Q_1$, of the rectangle AOLK, or, $$\tfrac{2}{3}Ka = \tfrac{2}{3}cl\sqrt{2g}a^{\frac{3}{2}}$$

Therefore, $$K = ca^{\frac{1}{2}}l\sqrt{2g} \quad (5)$$

substituting this value for "K" in equation (4), $$c\sqrt{2g}a^{\frac{1}{2}}l(h+\tfrac{2}{3}a) = \tfrac{2}{3}cl\sqrt{2g}[(h+a)^{\frac{3}{2}} - h^{\frac{3}{2}}] + c\sqrt{2g}\int_0^h x\sqrt{h-y}\, dy$$

or $$\tfrac{2}{3}l(\tfrac{3}{2}ha^{\frac{1}{2}} + a^{\frac{3}{2}}) = \tfrac{2}{3}l[(h+a)^{\frac{3}{2}} - h^{\frac{3}{2}}] + \int_0^h x\sqrt{h-y}\, dy.$$

Transposing, $$\int_0^h x\sqrt{h-y}\, dy = \tfrac{2}{3}l[a^{\frac{3}{2}} + \tfrac{3}{2}ha^1 + h^{\frac{3}{2}} - (h+a)^{\frac{3}{2}}] \quad (6)$$

Expanding $(h+a)^{\frac{3}{2}}$ by the binomial theorem, $$\int_0^h x\sqrt{h-y}\, dy = \tfrac{2}{3}l[a^{\frac{3}{2}} + \tfrac{3}{2}a^{\frac{1}{2}}h + h^{\frac{3}{2}} - a^{\frac{3}{2}} - \tfrac{3}{2}a^{\frac{1}{2}}h - \tfrac{3}{8}a^{-\frac{1}{2}}h^2 + \tfrac{1}{16}a^{-\frac{3}{2}}h^3 - \tfrac{3}{128}a^{-\frac{5}{2}}h^4 + \tfrac{3}{256}a^{-\frac{7}{2}}h^5 - \tfrac{7}{1024}a^{-\frac{9}{2}}h^6 + \tfrac{9}{2048}a^{-\frac{11}{2}}h^7 - \text{etc.}]$$

$$\int_0^h x\sqrt{h-y}\, dy = \tfrac{2}{3}l[h^{\frac{3}{2}} - \tfrac{3}{8}a^{-\frac{1}{2}}h^2 + \tfrac{1}{16}a^{-\frac{3}{2}}h^3 - \tfrac{3}{128}a^{-\frac{5}{2}}h^4 + \tfrac{3}{256}a^{-\frac{7}{2}}h^5 - \tfrac{7}{1024}a^{-\frac{9}{2}}h^6 + \tfrac{9}{2048}a^{-\frac{11}{2}}h^7 - \text{etc.}] \quad (7)$$

By a well known theorem of mathematics it is evident that $x\sqrt{h-y}$ is identical with, and may be replaced by a series which, when integrated with respect to "$y$" and after substitution of the limits, will give a resultant series identical with the right hand member of equation (7); or in other words "$x$" may be replaced by an ascending series in "$y$" in which the powers of "$y$" are such that the resultant series will be obtained as stated above. It is evident on inspection that this condition is fulfilled when, $$x = A_1 + A_2 y^{\frac{1}{2}} + A_3 y^{\frac{2}{2}} + A_4 y^{\frac{3}{2}} + A_5 y^{\frac{4}{2}} + A_6 y^{\frac{5}{2}} + \text{etc.} \quad (8)$$

where $A_1, A_2, A_3$, etc., are constant coefficients whose values are to be determined.

Substituting for "$x$" its value as given in equation (8)

$$\int_0^h x\sqrt{h-y}\, dy = A_1\int_0^h \sqrt{h-y}\, dy + A_2\int_0^h y^{\frac{1}{2}}\sqrt{h-y}\, dy + A_3\int_0^h y^{\frac{2}{2}}\sqrt{h-y}\, dy + A_4\int_0^h y^{\frac{3}{2}}\sqrt{h-y}\, dy + \text{etc.}$$
$$= A_1\int_0^h \sqrt{h-y}\, dy + A_2\int_0^h \sqrt{hy-y^2}\, dy + A_3\int_0^h y\sqrt{hy-y^2}\, dy + A_4\int_0^h y^2\sqrt{hy-y^2}\, dy + \text{etc.} \quad (9)$$

Integrating separately each term of equation (9), $$\int_0^h x\sqrt{h-y}\, dy = \tfrac{2}{3}A_1 h^{\frac{3}{2}} + \tfrac{1}{8}\pi A_2 h^2 + \tfrac{1}{16}\pi A_3 h^3 + \tfrac{5}{128}\pi A_4 h^4 + \tfrac{7}{256}\pi A_5 h^5 + \tfrac{21}{1024}\pi A_6 h^6 + \tfrac{33}{2048}\pi A_7 h^7 + \text{etc.} \quad (10)$$

Equating the right hand members of equations (7) and (10), $$\tfrac{2}{3}l[h^{\frac{3}{2}} - \tfrac{3}{8}a^{-\frac{1}{2}}h^2 + \tfrac{1}{16}a^{-\frac{3}{2}}h^3 - \tfrac{3}{128}a^{-\frac{5}{2}}h^4 + \tfrac{3}{256}a^{-\frac{7}{2}}h^5 - \tfrac{7}{1024}a^{-\frac{9}{2}}h^6 + \tfrac{9}{2048}a^{-\frac{11}{2}}h^7 - \text{etc.} = \tfrac{2}{3}A_1 h^{\frac{3}{2}} + \tfrac{1}{8}\pi A_2 h^2 + \tfrac{1}{16}\pi A_3 h^3 + \tfrac{5}{128}\pi A_4 h^4 + \tfrac{7}{256}\pi A_5 h^5 + \tfrac{21}{1024}\pi A_6 h^6 + \tfrac{33}{2048}\pi A_7 h^7 + \text{etc.}$$

The powers of "$h$" being the same in both members of this equation, the coefficients are identical; hence $$\tfrac{2}{3}A_1 = \tfrac{2}{3}l \text{ whence } A_1 = l$$

$$\tfrac{1}{8}\pi A_2 = -\tfrac{1}{4}a^{-\tfrac{1}{2}}l \quad \text{``} \quad A_2 = -\tfrac{2}{\pi}a^{-\tfrac{1}{2}}l$$

$$\tfrac{3}{16}\pi A_3 = \tfrac{1}{24}a^{-\tfrac{3}{2}}l \quad \text{``} \quad A_3 = \tfrac{2}{3\pi}a^{-\tfrac{3}{2}}l$$

$$\tfrac{5}{128}\pi A_4 = -\tfrac{1}{64}a^{-\tfrac{5}{2}}l \quad \text{``} \quad A_4 = -\tfrac{2}{5\pi}a^{-\tfrac{5}{2}}l$$

$$\tfrac{7}{256}\pi A_5 = \tfrac{1}{128}a^{-\tfrac{7}{2}}l \text{ whence } A_5 = \tfrac{2}{7\pi}a^{-\tfrac{7}{2}}l$$

$$\tfrac{21}{1024}\pi A_6 = -\tfrac{7}{1536}a^{-\tfrac{9}{2}}l \quad \text{``} \quad A_6 = -\tfrac{2}{9\pi}a^{-\tfrac{9}{2}}l$$

$$\tfrac{33}{2048}\pi A_7 = \tfrac{3}{1024}a^{-\tfrac{11}{2}}l \quad \text{``} \quad A_7 = \tfrac{2}{11\pi}a^{-\tfrac{11}{2}}l$$

substituting the values of $A_1$, $A_2$, $A_3$, etc., in equation (8), $$\begin{aligned}x &= l - \tfrac{2l}{\pi}a^{-\tfrac{1}{2}}y^{\tfrac{1}{2}} + \tfrac{2l}{3\pi}a^{-\tfrac{3}{2}}y^{\tfrac{3}{2}} - \tfrac{2l}{5\pi}a^{-\tfrac{5}{2}}y^{\tfrac{5}{2}} + \tfrac{2l}{7\pi}a^{-\tfrac{7}{2}}y^{\tfrac{7}{2}} - \tfrac{2l}{9\pi}a^{-\tfrac{9}{2}}y^{\tfrac{9}{2}} + \tfrac{2l}{11\pi}a^{-\tfrac{11}{2}}y^{\tfrac{11}{2}} - \text{etc.} \\ &= l - \tfrac{2l}{\pi}\left[\tfrac{y^{\tfrac{1}{2}}}{a^{\tfrac{1}{2}}} - \tfrac{1}{3}\times\tfrac{y^{\tfrac{3}{2}}}{a^{\tfrac{3}{2}}} + \tfrac{1}{5}\times\tfrac{y^{\tfrac{5}{2}}}{a^{\tfrac{5}{2}}} - \tfrac{1}{7}\times\tfrac{y^{\tfrac{7}{2}}}{a^{\tfrac{7}{2}}} + \tfrac{1}{9}\times\tfrac{y^{\tfrac{9}{2}}}{a^{\tfrac{9}{2}}} - \tfrac{1}{11}\times\tfrac{y^{\tfrac{11}{2}}}{a^{\tfrac{11}{2}}} + \text{etc.}\right] \\ &= l - \tfrac{2l}{\pi}\left[\sqrt{\tfrac{y}{a}} - \tfrac{1}{3}\left(\sqrt{\tfrac{y}{a}}\right)^3 + \tfrac{1}{5}\left(\sqrt{\tfrac{y}{a}}\right)^5 - \tfrac{1}{7}\left(\sqrt{\tfrac{y}{a}}\right)^7 + \tfrac{1}{9}\left(\sqrt{\tfrac{y}{a}}\right)^9 - \tfrac{1}{11}\left(\sqrt{\tfrac{y}{a}}\right)^{11} + \text{etc.}\right]\end{aligned} \quad (11)$$

But, $$\sqrt{\tfrac{y}{a}} - \tfrac{1}{3}\left(\sqrt{\tfrac{y}{a}}\right)^3 + \tfrac{1}{5}\left(\sqrt{\tfrac{y}{a}}\right)^5 - \tfrac{1}{7}\left(\sqrt{\tfrac{y}{a}}\right)^7 + \tfrac{1}{9}\left(\sqrt{\tfrac{y}{a}}\right)^9 - \tfrac{1}{11}\left(\sqrt{\tfrac{y}{a}}\right)^{11} + \text{etc.} = \tan^{-1}\sqrt{\tfrac{y}{a}}$$

Therefore $$x = l - \tfrac{2l}{\pi}\tan^{-1}\sqrt{\tfrac{y}{a}}$$

or $$x = l\left[1 - \tfrac{2}{\pi}\tan^{-1}\sqrt{\tfrac{y}{a}}\right]$$

which is the equation of the curve LU' with reference to the axes XX and YY.

In practice I make the height $a$ small as compared with the total height of orifice to be utilized and below the height of the liquid at which the meter is to be operated in practice. In any particular instance it may be made as small as desired and the proportional relation of head and discharge will still hold good for levels above level XX. From the foregoing, it will be readily understood that owing to the fundamental property of the orifice each inch of increased head, for example, above the line XX, induces a fixed increment in the amount of water discharged through the said orifice and that the several increments are mutually equal. Other shapes of orifice giving similar results may also be used, but I have shown the preferred form.

I claim:

1. A liquid meter provided with a weir notch having a datum level, a minimum operative level above the datum level, and a bottom level below the datum level, the width of the notch above the minimum operative level being such that the flow of liquid therethrough will at all levels above the minimum operative level be in direct proportion to the height of liquid above the datum level.

2. A liquid meter provided with a weir notch having an edge formed on a constantly changing curvature and extending from the line of minimum operative level to the line of maximum operative level, said notch having its datum level below the line of minimum operative level and its bottom edge below the datum level, the width of the notch between said maximum and minimum operative levels being such that the flow of liquid therethrough will at all levels above the minimum operative level be in direct proportion to the height of liquid above the datum level.

3. A liquid meter provided with a weir notch having a datum level, a minimum operative level above the datum level, and a bottom level below the minimum operative level, the width of the notch above the minimum operative level being such that the flow of liquid therethrough will at all levels above the minimum operative level be in direct proportion to the height of liquid above the datum level.

Sept. 30/13.

VICTOR SUTRO,
*Administrator of the estate of Harry Herbert Sutro, deceased.*

In presence of—
  VIOLA E. HUGHES,
  MAXWELL G. ELBERLY.